US006303203B1

(12) United States Patent
Bull

(10) Patent No.: US 6,303,203 B1
(45) Date of Patent: *Oct. 16, 2001

(54) PROTECTIVE CLEAR LAYER FOR IMAGES

(75) Inventor: Sally J. Bull, North Saint Paul, MN (US)

(73) Assignee: 3M Innovatives Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,707

(22) PCT Filed: May 16, 1996

(86) PCT No.: PCT/US96/07079

§ 371 Date: Nov. 13, 1998

§ 102(e) Date: Nov. 13, 1998

(87) PCT Pub. No.: WO97/43128

PCT Pub. Date: Nov. 20, 1997

(51) Int. Cl.$^{7}$ .............................. B32B 33/00; B32B 9/00

(52) U.S. Cl. ........................ 428/41.7; 428/41.8; 428/354; 428/343

(58) Field of Search ................................ 428/41.7, 41.8, 428/354, 343

(56) References Cited

U.S. PATENT DOCUMENTS

| | | | | |
|---|---|---|---|---|
| 5,085,907 | * | 2/1992 | Smith . | |
| 5,114,520 | | 5/1992 | Wang, Jr. et al. | 156/240 |
| 5,370,960 | | 12/1994 | Cahill et al. | 430/124 |
| 5,397,634 | * | 3/1995 | Cahill . | |
| 5,647,935 | * | 7/1997 | Hoshino . | |
| 5,681,660 | | 10/1997 | Bull et al. | 428/500 |
| 5,869,179 | * | 2/1999 | Cahill | 428/354 |

FOREIGN PATENT DOCUMENTS

WO 93/22137 11/1993 (WO) ............................ B32B/27/08

OTHER PUBLICATIONS

Richard J. Lewis, Sr., Hawley's Condensed Chemical Dictionary, 13$^{th}$ ed., (1997), p. 825.

Patent Abstract of Japan–JP60195146; Nippon Carbide Kogyo KK; Oct. 3, 1985.

Patent Abstracts of Japan–JP62074910; Toyo Soda Mfg Co Ltd.; Apr. 6, 1987.

Research Disclosure–No. 323, (1991) Mar.; p. 198 XP 000176287 "Improvement of Image Surface Quality by Planarization with a Second Index–Matching Medium".

* cited by examiner

*Primary Examiner*—Elizabeth M. Cole
*Assistant Examiner*—Arti R. Singh
(74) *Attorney, Agent, or Firm*—Dale A. Bjorkman

(57) ABSTRACT

An optically clear, transparent, protective layer is disclosed for transfer from a release liner (not shown) to an imaged substrate. The layer has a composition including vinyl resin, optional acrylic resin, optional plasticizer, and an optional stabilizer. The layer optionally includes a pressure sensitive adhesive which adheres to the imaged substrate and image with pressure, followed by removal of the release liner. The release liner has a Sheffield smoothness value of from 1 to 10. A method of making is also disclosed. An image may also be present between the protective layer and the pressure sensitive adhesive.

19 Claims, 2 Drawing Sheets

PROTECTIVE CLEAR LAYER FOR IMAGES

FIELD OF THE INVENTION

This invention relates to an optically clear layer for application to images on substrates.

BACKGROUND OF THE INVENTION

Electronic graphics produced via electrographic processes, inkjet processes, and the like, is rapidly becoming a preferred method for the formation of images. The Scotchprint™ Electronic Graphics Systems commercially available from Minn. Mining and Manufacturing Company of St. Paul, Minn. ("3M Company") uses an electrostatic process for forming an image and transferring that image to a durable substrate. One description of the process is found in U.S. Pat. No. 5,114,520 (Wang et al.).

The image formed on a durable substrate requires protection from abrasion and ultraviolet light. An optically clear, transparent overlaminate, comprising an optically clear, transparent durable film covered on a major surface by an optically clear, transparent pressure sensitive adhesive, is preferably applied over the image on the durable substrate. Commercially available clear, transparent overlaminates include Product Nos. 8910, 8911, 8912, 8913, 8920, 8930, and 8931 films from the Commercial Graphics Division of 3M Company, St. Paul, Minn. Of these, 8913 and 8930 are optically clear. Some of the clear, transparent overlaminates include a vinyl or polyester film covered with a pressure sensitive adhesive, which is in turn is protected by a paper or polyester liner until usage. Other clear, transparent overlaminates include a vinyl or polyester film covered with a hot melt adhesive, and a scrim liner to prevent blocking.

In the absence of the use of a clear, transparent overlaminate, some fabricators apply a protective clear coat of a vinyl/acrylic material, such as Product Nos. 3920, 8920, 9720, 6620I, and 2120 protective coatings from the Commercial Graphics Division of 3M Company to protect the durable, imaged substrate. But such application of a liquid to a solid flat surface is subject to the inconsistencies of climate, circumstances, and craftsmen.

While the optically clear, transparent overlaminates known in the art are quite acceptable for large format graphics uses, vinyl-based optically clear, transparent overlaminate films remain extremely elusive to achieve.

SUMMARY OF THE INVENTION

The art of electronic graphics needs an inexpensive, durable, optically clear, transparent layer to protect images formed on a major surface of substrates, when compared to other transparent layers known to those skilled in the art. This is especially true when the substrate is a perforated film with holes to allow viewing through the non-imaged surface.

One aspect of the present invention is an inexpensive, durable, optically clear, transparent layer formed on a polymeric release liner that has preferred surface properties to permit the layer of the present invention to have optical clarity within acceptable ranges.

A layer to cover and protect an imaged substrate comprises a composition comprising vinyl chloride resin, optional acrylic resin, optional plasticizer, and optional stabilizer, wherein the composition is formed on a polymeric release liner having thickness values from about 0.05 mm (0.002 inches) to about 0.12 mm (0.005 inches).

Another aspect of the present invention is a method of forming an inexpensive, durable, optically clear, transparent layer formed on an image residing on a durable substrate. A method of forming the layer comprises the steps of forming the optically clear, transparent layer having two major surfaces from an organosol on a first polymeric release liner having a thickness ranging from about 0.05 mm (0.002 inches) to about 0.127 mm (0.005 inches); optionally adhering a field of pressure sensitive adhesive to a second release liner; and optionally laminating the field of pressure sensitive adhesive to an exposed major surface of the optically clear, transparent layer; and optionally removing the first polymeric release liner.

Another aspect of the invention is a composite of an inexpensive, durable, optically clear, transparent layer covering a durable, imaged substrate. A composite comprises an optically clear, transparent layer covering a durable, imaged substrate, wherein the optically clear, transparent layer identified above.

A feature of the invention is the formation of the durable, optically clear, transparent layer on a polymeric release layer from a thermally processable composition, wherein the surface properties of the polymeric release layer determine the optical clarity of the layer of the present invention.

Another feature of the invention is the transfer of the durable, optically clear, transparent layer from the second release layer to the durable, imaged substrate.

An advantage of the invention is the ability to transfer the optically clear, transparent layer from a release layer to an imaged substrate.

Another advantage of the invention is the ability of the durable, optically clear, transparent layer to provide stabilization and protection from abrasion and ultraviolet light degradation.

Therefore, the present invention also includes a method of protecting an imaged substrate, comprising the steps of forming a layer of the present invention on a polymeric release liner; and laminating the layer of the present invention to the imaged substrate.

Embodiments of the invention are described with reference to the following drawings.

EMBODIMENTS OF THE INVENTION

Figure 1:
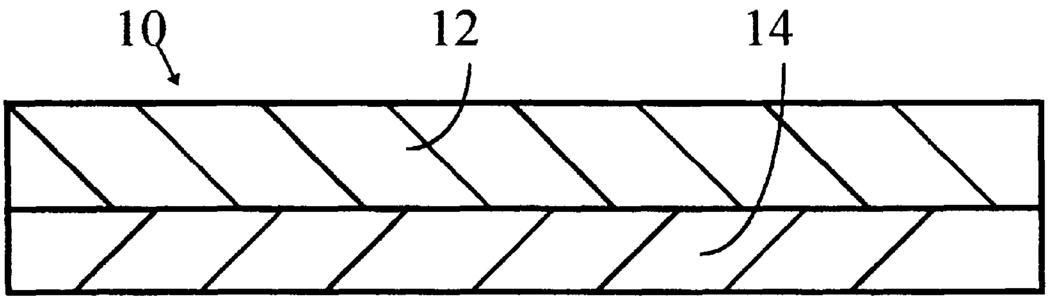
FIG. 1 illustrates a cross-sectional view of the durable, optically clear, transparent layer of the present invention prepared on a polymeric release layer.

FIG. 1 shows a preparation composite 10 comprising a durable, optically clear, transparent layer 12 of a thermally processable organosol composition on a polymeric release liner 14 having smooth surface properties helpful in the formation of the optical clarity properties of layer 12.

Liner 14 can be made from a polymeric release liner material known to those skilled in the art that has a surface roughness, measured according to Sheffield test method TAPPI Test T 538 om-88 published by the Technical Association for the Pulp and Paper Industry (TAPPI) of Atlanta, Ga., of from about 1 to about 10 Sheffields. Selection of the liner 14 should recognize the nature of the surface of liner 14 contacting layer 12 will determine the appearance of the outer surface of layer 12 on the durable, imaged substrate. Nonlimiting examples of release liners include silicone coated polyester, urea alkyd coated polyester, and the like. Particularly preferred for release liner 14 is a urea alkyd coated polyester having a urea polymer coating comprising a polyurea alkyd formulation of 0.005 mm caliper on a 0.07 mm polyester film.

Release liner 14 can have a gloss ranging from about 100 to about 150 and preferably from about 120 to about 140. Gloss is measured by a Gardner 60° Glossmeter using published techniques known to those skilled in the art such as ASTM Standard No. D523.

Durable, optically clear, transparent layer 12 comprises a thermally processable composition containing vinyl chloride, optional additional thermally processable resins, an optional plasticizer, and an optional stabilizer where the layer can be prepared from an organosol with a sufficient melt temperature to be thermally processable to cause layer 12 to form on the polymeric release liner 14 without causing harm to the surface of liner 14 responsible for formation of the optical clarity properties of the layer 12.

Vinyl chloride is an industrial chemical commercially available from many sources throughout the world. Preferably, the vinyl chloride useful in the present invention is a vinyl chloride resin comprising Geon vinyl chloride resin commercially available from B. F. Goodrich Chemical Company of Cleveland, Ohio.

When used as another, but optional resin, in the formation of layer 12, acrylic resin is readily available as an industrial chemical commercially available from many sources throughout the world. Desirably, the acrylic resin useful in layer 12 comprises from about 75,000 to about 125,000 number average molecular weight. Preferably, the acrylic resin useful in the present invention is an acrylic resin comprising Elavacite acrylic resin having about 100,000 molecular weight commercially available from ICI Resins of Wilmington, Del.

Optionally, the composition for layer 12 comprises a plasticizer to aid in the formation of layer 12 and its transfer to a durable, imaged substrate. Nonlimiting examples of plasticizer include 1,4-butylene glycol; adipic acid; butyloctyl phthalate; hydrocarbon resins; di(2-ethylhexyl) azelate; dibutyl azelate; dihexyl azelate; and the like. Particularly preferred for a plasticizer, if present in the composition of layer 12, is Vikoflex 7170 plasticizer commercially available from ATOChem of Philadelphia, Pa.

Optionally, the composition for layer 12 comprises a stabilizer to aid in the formation of layer 12, provide ultraviolet resistance, and assist transfer to a durable, imaged substrate. Nonlimiting examples of stabilizer include Hal-Lub, Hal-Base, Hal-Carb, Hal-Stab brand hindered amine light stabilizers commercially available from Hal-stab Company of Hammond, Indiana; Nuostabe V1923 brand ultraviolet light stabilizer commercially available from Witco of Greenwich, Connecticut; Cosorb brand ultraviolet light stabilizer commercially available from 3M Company of St. Paul, Minn.; and Tinuvin brand HAL stabilizers commercially available from Ciba-Geigy Corp. of Greensboro, N.C. Particularly referred for a stabilizer, if present in the composition of layer 12, is Tinuvin 1130 and Tinuvin 292 HAL stabilizers from Ciba-Geigy or Nuostabe V1923 stabilizer.

The layer 12 can have a composition ranging from about 40 to bout 60 weight percent of vinyl chloride, from about 10 to about 30 weight percent acrylic resin, from about 0 to about 33 weight percent plasticizer, and from about 0 to about 10 weight percent stabilizer.

Desirably, layer 12 can have composition ranging from about 45 to about 55 weight percent of vinyl chloride, from about 15 to about 30 weight percent acrylic resin, from about 0 to about 20 weight percent plasticizer, and from about 0 to about 8 weight percent stabilizer.

Preferably, layer 12 can have composition ranging from about 47 to about 60 weight percent of vinyl chloride, from about 16 to about 27 weight percent acrylic resin, from about 10 to about 20 weight percent plasticizer, and from about 2 to about 6 weight percent stabilizer.

Composition for layer 12 can be prepared by dissolving the ingredients into solvents such as ketones and aromatics, preferably Di-isobutyl ketone, mineral spirits, methyl ethyl ketone, methyl isobutyl ketone and toluene, more preferably in equal parts of such solvents. Layer 12 is knife or gravure coated on liner 14 with a dry coating weight ranging from about 0.70 to about 1.10 g to yield a dry thickness of from about 0.04 mm (0.0015 inches) to about 0.08 mm., (0.0030 inches). Preferably, liner 14 has a thickness ranging from about 0.5 mm (0.002 inches) to about 1 mm and layer 12 has a thickness ranging from about 0.5 mm (0.002 inches) to about 1 mm.

After coating, layer 12 is dried on liner 14 to remove solvents at a temperature ranging from about 90° C. to about 120° C. for about 2 minutes, then it is fused in an oven for 30 seconds to 60 seconds at 175° C. to 205° C. Composite 10 is then stored until usage, optionally, but preferably as a portion of a lamination with a field of pressure sensitive adhesive (PSA) and a second release liner protecting the PSA field.

Figure 2:
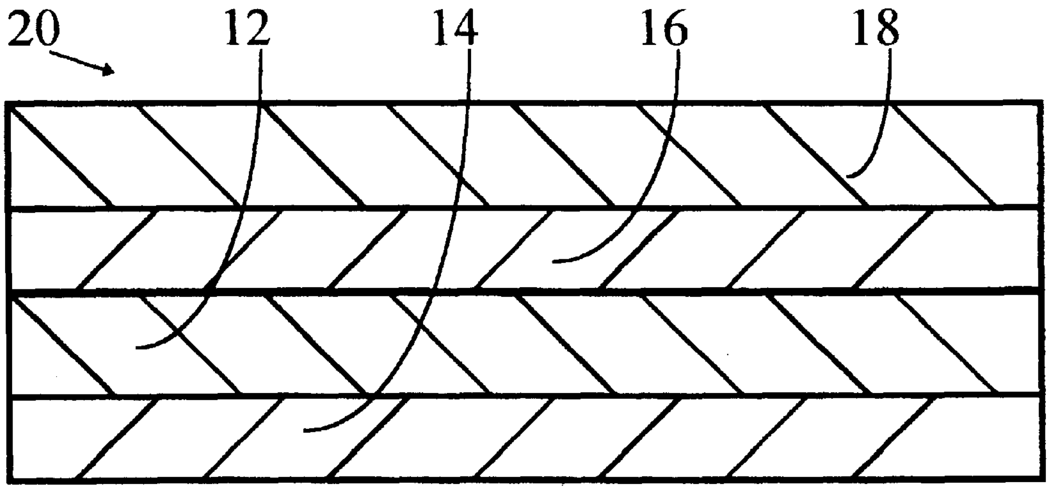
FIG. 2 illustrates a cross-sectional view of the durable, optically clear, transparent layer of the present invention during a lamination step of the process of the present invention.

FIG. 2 illustrates a laminated composite 20, formed from the lamination of a PSA field 16 (protected by second release liner 18) laminated to a major surface of layer 12 opposite polymeric release liner 14.

Field 16 and liner 18 are combined in a separate step prior to lamination according to techniques well known to those skilled in the art.

Field 16 can be any conventional pressure sensitive adhesive that has optical clarity at least as good as and preferably better than the optical clarity properties of layer 12. Nonlimiting examples of such adhesives include polyacrylates, polyvinylethers, natural rubber, silicone, rubber, styrene butadiene, cis-polybutadiene, syrene-isoprene block copolymers. Preferably, adhesives used in the present invention include vinyl/acrylic blends having a weight percent ratio ranging from about 50/50 to about 90/10 and preferably about 75/25 and a viscosity of 1100–1500 centipoise.

Field 16 can have a laminated thickness of from about 0.013 mm to about 0.05 mm, and preferably from about 0.015 to about 0.03 mm.

Release liner 18 can be made from a release liner material known to those skilled in the art. Preferably, the release liner material 18 has a surface roughness, measured according to the TAPPI Test T 538 om-88 of from about 5 to about 40 Sheffields. Selection of the liner 18 will affect the appearance of layer 12 and PSA field 16 during storage and prior to usage, which may be material to customer preference for the layer of the present invention. Nonlimiting examples of release liners include silicone coated polyester, silicone coated paper, urea alkyd coated polyester, urea alkyd coated paper, and the like. Particularly preferred for release liner 18 is a silicone coated polyester commercially available from Rexam Release of Chicago, Ill. having a silicone coating of 0.005 mm caliper on a 0.07 mm polyester film.

Release liner 18 can have a gloss ranging from about 80 to about 130 and preferably from about 100 to about 130. Gloss is measured by a Gardner 60° Glossmeter using published techniques known to those skilled in the art such as ASTM Standard No. D523.

After lamination of PSA field 16 to layer 12, first polymeric release liner 14 can be removed prior to storage and use.

Figure 3:
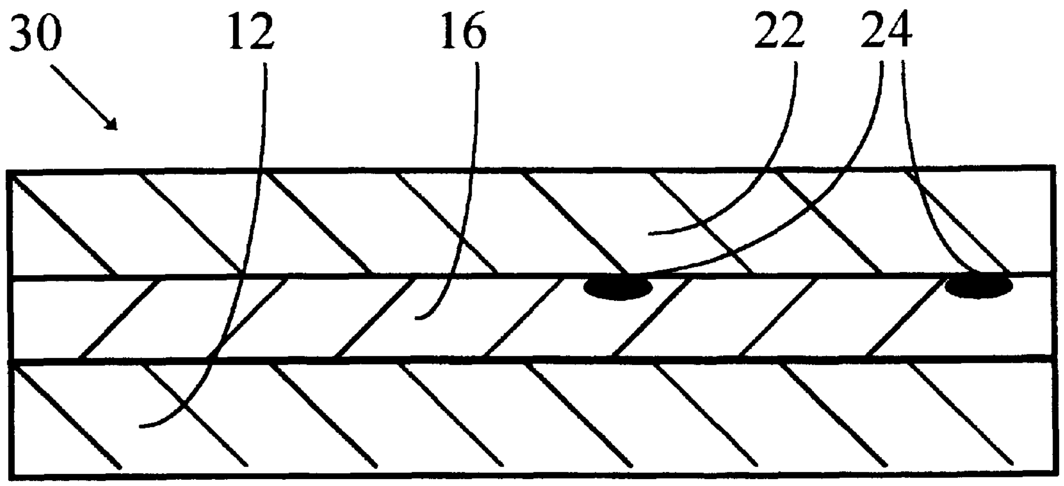
FIG. 3 illustrates a cross-sectional view of the durable, optically clear, transparent layer of the present invention in combination with an imaged substrate.

FIG. 3 illustrates the cross-sectional appearance of final composite 30 composed of layer 12 having PSA field 16 adhered to a major surface thereof and also adhered to a substrate 22 having an image 24 on the major surface thereof to which field 16 is adhered. Layer 12 and PSA field 16 contact a major surface of substrate 22 without enveloping substrate 22. Preferably, substrate 22 has image 24 on one major surface and a field 24 of adhesive (not shown) on the opposing major surface. Layer 12 is inappropriate to cover the field 24 of pressure sensitive adhesive.

Image 24 can be formed using any conventional process. Nonlimiting examples include electrographic processes, electrophotographic processes, electrostatic processes, ink-jet printing processes, and the like. When Scotchprint™ 8601 transfer paper (3M Company, St. Paul, Minn.) is used, an additional surface treatment process is preferred to be used, in order to retain clarity through the film. This process is described in copending, coassigned, U.S. Patent application Ser. No. 08/577,417, the disclosure of which is incorporated by reference herein.

Image 24 can comprises dyes, pigments, or combinations of both from toners, inks, or paints, all as known to those skilled in the art.

Preferably, image 24 comprises compositions capable of withstanding processing temperatures of at least than about 100° C., and preferably at least than about 105° C. This film surface is receptive to most inks, pigments, toners, dyes, and paints.

Substrate 22 can be any transparent substrate known to those skilled in the art of image graphics. Nonlimiting examples include transparent glass, transparent acrylic sheets and transparent polycarbonate sheets.

Layer 12 and PSA field 16 are transferred from liner 18 on composite 20 to image 24 and substrate 22 by application of pressure of a range sufficient to adhere PSA field 16 to substrate 22 and preferably from about 1 kg. to about 5 kg.

Layer 12 and PSA field 16 can have a combined caliper of from about 0.05 mm (0.002 inches) to about 0.13 mm when adhered to image 24 and substrate 22. Preferably, the caliper ranges from about 0.10 mm to about 0.13 mm.

After layer 12 and PSA field 16 are applied to image 24 and substrate 22, liner 18 can be removed, rolled, and can be recycled for later use.

Machinery conventionally used in the formation of durable imaged substrates can be used for the pressure sensitive transfer of layer 12 to substrate 22. Nonlimiting examples of machinery include laminators such as Scotchprint™ 9540 and 9542 brand laminators from 3M Company.

Figure 4:
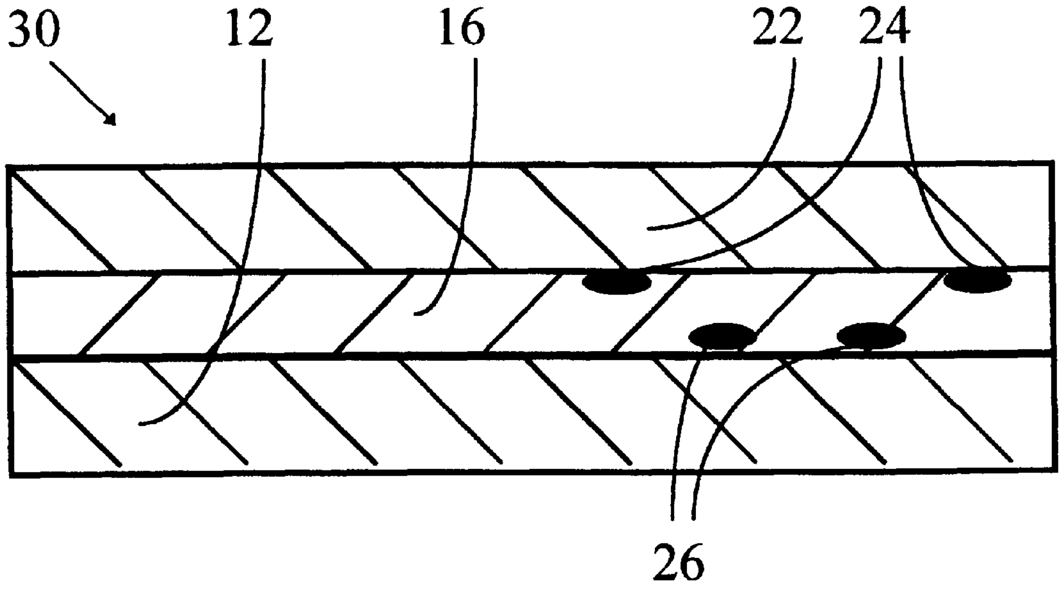
FIG. 4 illustrates a cross-sectional view of the durable, optically clear, transparent layer of the present invention in combination with an imaged substrate as another embodiment of the invention.

FIG. 4 illustrates an alternate embodiment of the present invention wherein image 26 is placed on layer 12 of composite 10 prior to adhering of PSA field 16 and then transfer layer 12 and PSA field 16, with image 26 between layer 12 and PSA field 16, is adhered to a substrate 22 (with or without a second image 24 as seen in FIG. 4) to become final composite 30. In this embodiment, one can use an electrostatic imaging transfer process such as the Scotchprint™ Electronic Imaging system and electrostatic imaging paper, such as No. 8601 image transfer paper, both commercially available from 3M Company, to place a 4-color toner image from the paper on layer 12, after which a PSA field 16 is adhered and the liner 14 is pealed away leaving image 26 on layer 12 for lamination transfer to a desirable durable film.

USEFULNESS OF THE INVENTION

Use of layer 12 provides abrasion and ultraviolet light protection to image 24, image 26, or both, and substrate 22.

Abrasivity for layer 12 of the present invention before the image 24 wears away ranges from about 500 to about 2000 cycles with CS-10 abrasion wheels commercially available from Taber Industries of Tonowanda, New York and preferably from about 500 to about 1000 cycles, depending the type of substrate used.

Layer 12 provides protection to image 24 and substrate 22 without detracting from the appearance of the image. Layer 18 is optically optically clear, transparent as determined by visual perception. Preferably, optical clarity gives acceptable vision when measured with a standard vision test with and without the film between one's eyes and the vision chart.

Further embodiments of the invention are described in the following examples.

EXAMPLES

Example 1

Preparation of Protective Clear Layer

A protective clear layer was prepared on an urea alkyd coated polyester having a urea polymer coating comprising a polyurea alkyd formulation of 0.005 mm caliper on a 0.07 mm polyester film from the following components.

46.7 weight percent Geon 178 vinyl resin (B.F. Goodrich, Cleveland, Ohio); 17.9 weight percent Elvacite acrylic resin (ICI Resins, Wilmington, Del.); 17.2 weight percent Vikoflex 7170 plasticizer (ATOChem, Philadelphia, Pa.); 2.3 weight percent Tinuvin 292 HAL stabilizer (Ciba-Geigy, Greensboro, N.C.); 2.3 weight percent Nuostabe V1923 stabilizer (Witco, Greenwich, Conn.) and 13.6 weight percent of a solvent system of two parts of di-isobutyl ketone and one part mineral spirits.

A layer was knife coated on the liner with a wet thickness of 0.127 mm and dried to remove solvents at a temperature of 120° C. for 2 minutes, and then fused in an oven for 45 seconds at 175° C. to a dry thickness of about 0.05 mm.

Example 2

Preparation of Adhesive Laminate

An adhesive was prepared from the following components:

| | |
|---|---|
| VYHH (Union Carbide, Danbury, CT) | 69 parts |
| Acryloid B82 (Rohm and Haas, Philadelphia, PA) | 17 parts |
| Paraplex G62 (C.P. Hall, Bedford Park, IL) | 14 parts |

The components were dissolved in a solvent mixture comprised of equal parts xylol, methyl ethyl ketone and methyl isobutyl ketone to yield a final solution viscosity of 1100–1600 centipoise. A field of solution was knife coated at 0.076 mm wet thickness on a silicone coated polyester release liner having a silicone coating of 0.005 mm caliper on a 0.07 mm polyester film (Rexam Release, Chicago, Ill.) and dried at 120° C. for 2 minutes to obtain a dry thickness of 0.0025 mm.

Example 3

Laminate

The layer on liner from Example 1 was then contacted to the adhesive field from Example 2 to produce the laminate as seen in FIG. 2, applying a pressure of about 2.3 Kg/$cm^2$.

While embodiments have been described, the claims follow.

What is claimed is:

1. An optically clear and transparent vinyl layer having two major surfaces formed from an organosol composition comprising vinyl chloride resin, optional acrylic resin, and optional stabilizer, the organosol composition having a melt temperature such that the organosol composition is thermally processable and fusable in an oven, and formed on a polymeric release liner having smoothness of a Sheffield value of from about 1 to about 10; and a field of pressure sensitive adhesive adhered to an exposed major surface of the vinyl layer, wherein the adhesive is optically clear and has optical clarity as good or better than the optical clarity of the vinyl layer.

2. The vinyl layer of claim 1 further comprising acrylic resin.

3. The layer of claim 2, wherein the amount of vinyl chloride resin ranges from about 49 to about 72 weight percent; the amount of acrylic resin ranges from about 9 to about 33 weight percent; the amount of plasticizer ranges from about 0 to about 25 weight percent; and wherein the stabilizer ranges from about 0 to about 8 weight percent.

4. The vinyl layer of claim 1, wherein the amount of vinyl chloride resin ranges from about 55 to about 65 weight percent; the amount of acrylic resin ranges from about 16 to about 27 weight percent; the amount of plasticizer ranges from about 10 to about 16 weight percent; and wherein the stabilizer ranges from about 2 to about 6 weight percent.

5. The layer of claim 4, wherein the layer has a caliper ranging from about 0.05 mm to about 0.13 mm.

6. The layer of claim 5, wherein the layer is adhered on the imaged substrate using a pressure ranging from about 0.7 Kg./sq.cm. to about 4.2 Kg./sq.cm.

7. A method of forming a layer of claim 1 for protecting an imaged substrate, comprising the steps of:

(a) forming the optically clear, transparent layer having two major surfaces from said organosol on a first polymeric release liner having smoothness or a Sheffield value of from about 1 to about 10;

(b) adhering a field of pressure sensitive adhesive to a second release liner; and (c) laminating the field of pressure sensitive adhesive to an exposed major surface of the optically clear, transparent layer; and (d) optionally removing the first polymeric release liner.

8. The method of claim 7, wherein the method further comprises after the transferring step the step of placing an image on the layer prior to the adhering step.

9. The method of claim 7, further comprising the step of removing the second release liner.

10. The method of claim 7, wherein the laminating step uses a pressure ranging from about 1.7 Kg./sq.cm. to about 4.2 Kg./sq.cm.

11. The method of claim 7, wherein the amount of vinyl chloride resin ranges from about 40 to about 60 weight percent; the amount of acrylic resin ranges from about 10 to about 30 weight percent; the amount of plasticizer ranges from about 0 to about 25 weight percent; and wherein the stabilizer ranges from about 0 to about 8 weight percent.

12. The method of claim 7, wherein the amount of vinyl chloride resin ranges from about 45 to about 55 weight percent; the amount of acrylic resin ranges from about 15 to about 30 weight percent; the amount of plasticizer ranges from about 10 to about 16 weight percent; and wherein the stabilizer ranges from about 2 to about 6 weight percent.

13. The method of claim 12, wherein the layer has a caliper ranging from about 0.04 mm to about 0.08 mm.

14. The method of claim 7, wherein the imaged substrate is a durable film.

15. The method of claim 7, wherein the imaged substrate is an electrostatic imaging paper comprising an image, a dielectric layer, and a bottom layer.

16. The method of claim 15, wherein the method further comprises the steps of removing the dielectric layer and the bottom layer leaving the image contacting the durable, optically clear, transparent layer and laminating the image and the composite to a film and the step of removing the release liner from the composite.

17. A composite comprising an optically clear, transparent layer covering an imaged substrate including a perforated film, wherein the optically clear, transparent layer comprises a layer of claim 1.

18. A method of protecting an imaged substrate, comprising the steps of: forming a layer of claim 1 on a polymeric release liner; and laminating the layer to an imaged substrate.

19. The method of protecting the imaged substrate according to claim 18, wherein the layer also has an image on a major surface thereof.

* * * * *

UNITED STATES PATENT AND TRADEMARK OFFICE

CERTIFICATE OF CORRECTION

PATENT NO. : 6,303,203 B1
DATED : October 16, 2001
INVENTOR(S) : Bull, Sally J.

It is certified that error appears in the above-identified patent and that said Letters Patent is hereby corrected as shown below:

Title page,
ABSTRACT, line 9, delete the sentence "A method of making is also disclosed." and insert therefore -- A method of making and a method of using the layer are also disclosed. --

Column 4,
Line 2, delete "bout" and insert therefore -- about --.

Column 5,
Line 34, delete "comprises" and insert therefore -- comprise --.

Signed and Sealed this

Twenty-third Day of April, 2002

*Attest:*

JAMES E. ROGAN

*Attesting Officer*

*Director of the United States Patent and Trademark Office*